United States Patent [19]

Matsumoto

[11] 4,065,809

[45] Dec. 27, 1977

[54] MULTI-PROCESSING SYSTEM FOR CONTROLLING MICROCOMPUTERS AND MEMORIES

[75] Inventor: Mitsuo Matsumoto, Kokubunji, Japan

[73] Assignee: Tokyo Shibaura Electric Co., Ltd., Kawasaki, Japan

[21] Appl. No.: 690,603

[22] Filed: May 27, 1976

[51] Int. Cl.² .................... G06F 15/16; G06F 13/00
[52] U.S. Cl. ................................................ 364/200
[58] Field of Search .................. 340/172.5; 364/200, 364/900

[56] References Cited

U.S. PATENT DOCUMENTS

| | | | |
|---|---|---|---|
| 3,242,467 | 3/1966 | Lamy | 340/172.5 |
| 3,469,239 | 9/1969 | Richmond | 340/172.5 |
| 3,528,062 | 9/1970 | Lehman | 340/172.5 |
| 3,581,291 | 5/1971 | Iwamoto | 340/172.5 |
| 3,761,879 | 9/1973 | Brandsma | 340/172.5 |
| 3,771,137 | 11/1973 | Barner | 340/172.5 |
| 3,821,715 | 6/1974 | Huff, Jr. | 340/172.5 |
| 3,959,775 | 5/1976 | Valassis | 340/172.5 |

OTHER PUBLICATIONS

*IBM Technical Disclosure Bulletin*, "Multiprocessing Storage Priority Network", Capowski, Jones, Meschi, vol. 14, No. 10, Mar. 1972, pp. 3141-3143.
"Multiprocessing Storage Conflict Resolution Technique", Duke, Messina, *IBM Technical Disclosure Bulletin*, vol. 15, No. 10, Mar. 1973, pp. 3232-3233.

Primary Examiner—James D. Thomas
Attorney, Agent, or Firm—Oblon, Fisher, Spivak, McClelland & Maier

[57] ABSTRACT

A microcomputer system comprising two microcomputers, a read only memory (hereinafter abbreviated as "ROM") and a random access memory (hereinafter abbreviated as "RAM") exclusively used with each of the two microcomputers and a common RAM accessible from the two microcomputers, wherein the microcomputers and memories are connected together; there are provided between the microcomputers and common RAM an address decoder for detecting the access of the respective microcomputers to the common RAM and a control flip-flop circuit which is set when one of the two microcomputers completes a memory access cycle and is reset when the other finishes a memory access cycle; when the transfer of data is not carried out between the two microcomputers, then these microcomputers generally make an access to the corresponding exclusive memories; only when an access to the common RAM is made by the two microcomputers substantially at the same time, then the flip-flop circuit places one of the two microcomputers in a waiting position for memory access until the other finishes a memory access cycle; and in any other case, the two microcomputers carry out arithmetic operation independently of each other.

4 Claims, 3 Drawing Figures

MULTI-PROCESSING SYSTEM FOR CONTROLLING MICROCOMPUTERS AND MEMORIES

BACKGROUND OF THE INVENTION

This invention relates to a microcomputer system and more particularly to a microcomputer system wherein the transfer of data between a plurality of microcomputer systems is effected through a common memory.

The microcomputer which performs an arithmetic operation at a far lower speed than the conventional mini-computer has presented difficulties in providing a numerical control system demanded to carry out a quick arithmetic operation. It has therefore been considered necessary to use a plurality of central processing units (hereinafter referred to as "CPU") and let the "CPU" share in arithmetic operation in order to provide a numerical control system capable of a high speed arithmetic operation. In this case, however, control between the respective CPU's and processing of data will unavoidably become complicated with respect to hard ware.

SUMMARY OF THE INVENTION

It is accordingly the object of this invention to provide such type of microcomputer system as makes it easy to provide a system demanded to carry out a quick arithmetic operation.

Accordingly to an aspect of the invention, there is provided a microcomputer system which comprises a plurality of microcomputers, a program area memory and data area memory both exclusively used with the respective microcomputers and a common data memory through which the plural microcomputers are connected, wherein, when the transfer of data is not carried out between the selected ones of said plural microcomputers, data is transferred between the microcomputers and the corresponding exclusive memories; each of the microcomputers performs an arithmetic operation independently of the arithmetic operation cycle of any other microcomputer, thus enabling an arithmetic operation, however complicated, to be effected as quickly as when a single microcomputer is used; a given one of the microcomputers which tries to have an access to the common data memory is placed on a waiting position only until any other microcomputer finishes an acess to said common data memory; and when said common data memory remains disengaged, any of the microcomputers can have an acess to said memory without waiting, thereby attaining smooth transfer of data between the respective microcomputers.

A microcomputer system embodying this invention comprises a plurality of microcomputers; memories exclusively used with the respective microcomputers; a data memory used in common to the microcomputers; and means for controlling the access of any of the microcomputers to the common data memory. This access-controlling means includes a flip-flop circuit which is set when the memory access cycle of one of the microcomputers is brought to an end, and is reset when the memory access cycle of the other microcomputer is finished; an address decoder for detecting the access of any of the microcomputers to the common data memory; and a logic circuit coupled to all the above-mentioned elements, thereby determining by simple arrangement the access priority of the respective microcomputers for control of their access to the common data memory.

A microcomputer system according to another embodiment of this invention comprises three or more microcomputers. In such case, a proper combination of these microcomputers can eliminate the necessity of separately providing exclusive memories, common data memories and logic circuits, thus simplifying the arrangement of the entire microcomputer system.

Other advantages and features of this invention will be understood from the description which follows.

DESCRIPTION OF THE PREFERRED EMBODIMENTS

Figure 1:
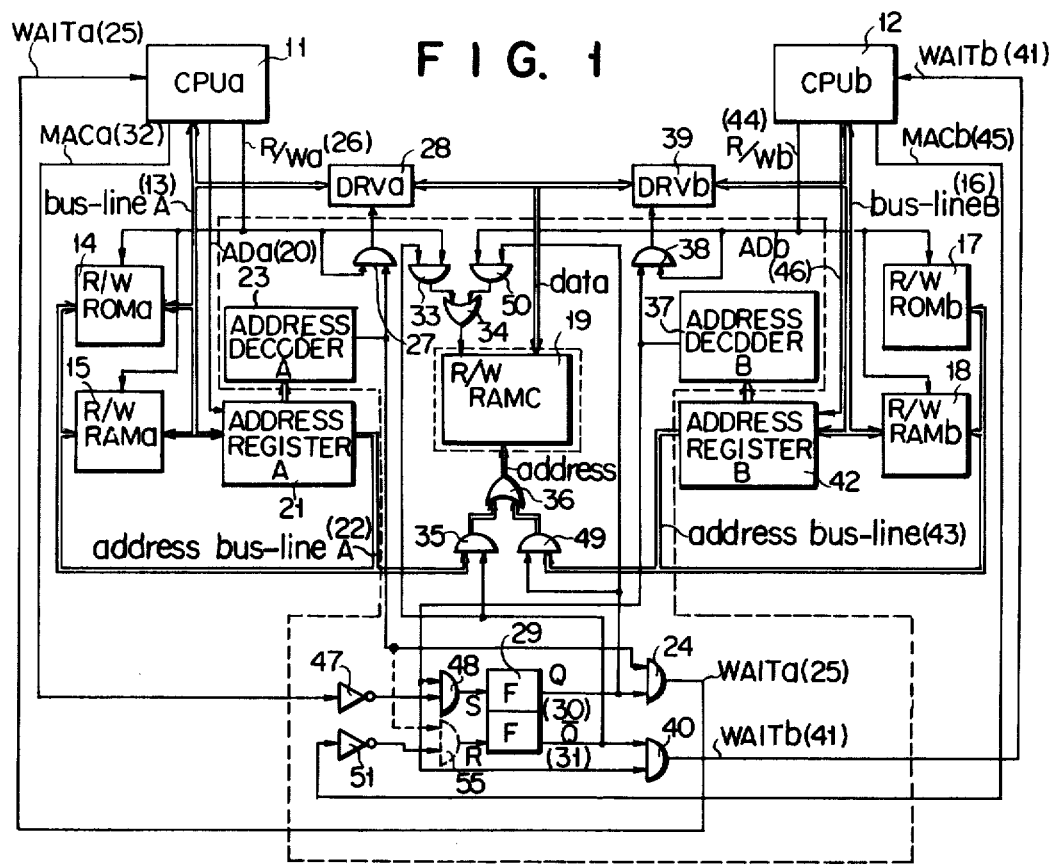
FIG. 1 is a block circuit diagram of a microcomputer system according to an embodiment of this invention which comprises two microcomputers.

A microcomputer system of FIG. 1 comprises two central processing units CPU$a$ 11 and CPU$b$ 12. The CPU$a$ 11 can have an access to its exclusive read only memory ROM$a$ 14 and randam access memory RAM$a$ 15 through eight bidirectional data bus lines A13. The ROM$a$ 14 is stored with an instruction program for deciding the processing sequence of the CPU$a$ 11. Data required for the arithmetic operation of the CPU$a$ 11 is written in or read out from RAM$a$ 15. Similarly, the CPU$b$ 12 can have an access to its exclusive ROM$b$ 17 and RAM$b$ 18 through eight bidirectional data bus lines B16. The ROM$b$ 17 is stored with a program for the operation of the CPU$b$ 12, and the RAM$b$ 18 is stored with data required for the arithmetic operation of the CPU$b$ 12.

RAM$c$ 19 is a common RAM accessible from both CPU$a$ 11 and CPU$b$ 12. Data required for the arithmetic operation of the CPU$a$ 11 and CPU$b$ 12 is written in or read out from the RAM$c$ 19.

There will now be outlined an operation carried out across the respective CPU's and the various memories. Now let it be assumed that the common memory RAM$c$ 19 has a capacity of storing an N number of words. For the access of the CPU$a$ 11 to the common memory RAM$c$ 19, a read-write instruction is sent forth to any desired address included in the address A to A+N−1 of the RAM$c$ 19 according to a program prepared for the CPU$a$ 11. Data is written in or read out from the selected address upon receipt of the read-write instruction. Where the CPU$a$ 11 issues a read-write instruction to any other address than those of the RAM$c$ 19 which are designated as A to A+N−1, then the exclusive memory ROM$a$ 14 or RAM$a$ 15 of the CPU$a$ 11 is set for access. Similarly, for the access of the CPU$b$ 12 to the RAM$c$ 19, it is advised to issue a read-write instruction from the CPU$b$ 12 to any desired address included in the address A to A+N−1 of the RAM$c$ 19.

A program instruction to write data in or read out data from any other address than those designated as A to A+N−1 sets the exclusive ROM$b$ 17 or RAM$b$ 18 of the CPU$b$ 12 for access.

Where the CPU$a$ 11 issues a read-write instruction to any address of the exclusive ROM$a$ 14, RAM$a$ 15 other than the A to A+N−1 address of the common RAM$c$ 19, then address information is set forth from the CPU*a* 11 to the bus line A13. Since, at this time, an address signal line AD*a* 20 is supplied with an address-designating signal having a logic level of "1", the address information which has been carried through the bus line A13 is stored in an address register A21. As mentioned above, the CPU*a* 11 is going to have an access to an address other than those designed as A to A+N−1. Therefore, the address register A21 is stored with information denoting any specified address of the exclusive ROM*a* 14 or RAM*a* 15. The address information stored in the address register A21 is transferred through an address bus line A22 to indicate the specified address of the exclusive ROM*a* 14 or RAM*a* 15. If an instruction produced is of the "readout" type, then data corresponding to the designated address is read out to the CPU*a* 11. An address decoder A23 is originally designed to produce a signal having a logic level of "1" at the output terminal only when information stored in the address register A21 represents any of the addresses A to A+N−1 of the RAM*c* 19. Therefore, in the above-mentioned case where the CPU*a* 11 is going to have an access to any address other than those of the RAM*c* 19 designated as A to A+N−1, the address decoder A23 generates an output having a logic level of "0". Accordingly, an output signal WAIT*a* 25 from an AND circuit 24 which can not produce an AND output under the above-mentioned condition has a logic level of "0". At this time, the CPU*a* 11 issues a read-write signal R/W*a* 26 having a logic level of "1" immediately after sending forth a "0" signal to the address signal line 20. Since, as mentioned-above, the address decoder A23 issues a "0" output, an AND circuit 27 can not generate an AND output, but sends forth a "0" output. As the result, a bidirectional bus driver DRV*a* 28 is turned off causing the CPU*a* 11 and RAM*c* 19 to be disconnected from each other. Further at this time, the address bus line A22 does not make an access to the RAM*c* 19, preventing any data from being written in or read out from said RAM*c* 19. Where "1" read-write signal R/W*a* 26 given forth by the CPU*a* 11 is of the "read" type, then data of any address of the ROM*a* 14 or RAM*a* 15 specified by the address register A21 through the address bus line A22 is load in the CPU*a* 11 through the bus line A13. Where the above-mentioned read-write signal R/W*a* 26 is of the "write" type, then the CPU*a* 11 also sends forth a write control signal (not shown) together with said read-write signal R/W*a* 26. As the result, "write" data is supplied to the RAM*a* 15 through the bus line A13. At this time, the "write" data delivered from the CPU*a* 11 is written in that of the address of the RAM*a* 15 which was previously specified by the address register A21 upon receipt of said write control signal.

For briefness, the operation of the "write" control signal is omitted from the following description.

With the microcomputer system of this invention arranged as described above, it will be understood that so long as the CPU*a* 11 has an access to any address other than the address A to A+N−1 of the RAM*c* 19, the CPU*a* 11 carries out an arithmetic operation independently of that of the CPU*b* 12 at a speed originally designed for the CPU*a* 11 itself. So long as the CPU*b* 12 has an access to any address other than the addresses A to A+N−1, an arithmetic operation is effected between the CPU*b* 12 and the exclusive ROM*b* 17 or RAM*b* 18. This arithmetic operation is performed quickly at such a speed as originally designed for the CPU*b* 12 itself.

Figure 2:
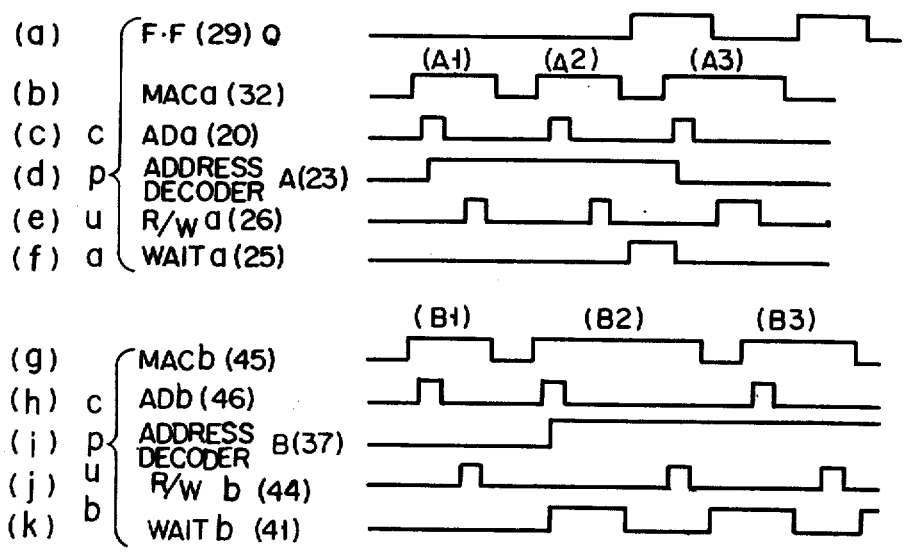
FIG. 2 is a timing chart illustrating the operation of the circuit of the microcomputer system of FIG. 1.

FIG. 2 is a timing chart, based on which the microcomputer system of FIG. 1 carries out program instructions. A first program instruction A1 performed by the CPU*a* 11 is an order for an access to the common RAM*c* 19. A second program instruction A2 is also a command for an access to the common RAM*c* 19. A third program instruction A3 is given for an access to the ROM*a* 14 or RAM*a* 15 other than the common RAM*c* 19. A first one B1 of the program instructions pusued by the CPU*b* 12 which are processed at the same time as those of the CPU*a* 11 is an order for an access to the ROM*b* 17 or RAM*b* 18 other than the common RAM*c* 19. A second program instruction B2 carried out by the CPU*b* 12 is a command for an access to the common RAM*c* 19. A third program instruction B3 followed by the CPU*b* 12 is also given for an access to the common RAM*c* 19. FIG. 2 also sets forth the timing in which these program instructions B1 and B3 are carried out.

There will now be described by reference to FIG. 2 the timing in which the CPU*a* 11 and CPU*b* 12 of FIG. 1 has an access to the common RAM*c* 19. The flip-flop circuit 29 of FIG. 1 selectively controls the access of the CPU*a* 11 to the corresponding exclusive memory ROM*a* 14 or RAM*a* 15 and the access of the CPU*b* 12 to the corresponding exclusive memory ROM*b* 17 or RAM*b* 18. The flip-flop circuit 29 is reset when the CPU*b* 12 finishes each program instruction. While being reset, the flip-flop circuit 29 produces an output having a logic level of "0" at a Q terminal 30 and an output having a logic level of "1" at a $\bar{Q}$ terminal 31. When initially reset, the flip-flop circuit 29 presents a condition shown in FIG. 2(*a*). Where, under this condition, the CPU*a* 11 of the subject microcomputer system carries out the first program instruction A1, then the CPU*a* 11 sends forth, as shown in FIG. 2(*b*) a memory access cycle signal MAC*a* 32 having a logic level of "1". Then the CPU*a* 11 produces, as shown in FIG. 2(*c*), an address signal AD*a* 20 having a logic level of "1". Upon receipt of the address signal AD*a* 20, address information obtained according to the first program instruction A1 carried out by the CPU*a* 11 passes through the bus line A13 to be stored in the address register A21. Since the first program instruction A1 orders the CPU*a* 11 to have an access to the common memory RAM*c* 19, the address decoder A23 produces, as previously mentioned, an output having a logic level of "1", as illustrated in FIG. 2(*d*).

At this time, an output from the Q terminal 30 of the flip-flop circuit 29 has a logic level of "0", causing the AND circuit 24 to generate an output WAIT*a* 25 also having a logic level of "0". So long as the signal WAIT*a* 25 continues to have a logic level of "0", the CPU*a* 11 can send forth the read-write signal R/W*a* 26 after the address signal AD*a* 20 has its logic level changed from "1" to "0". Where the signal WAIT*a* 25 has a logic level of "1", the CPU*a* 11 is prevented from producing a read-write signal R/W*a* 26 having a logic level of "1", even after the address signal AD*a* 20 has its logic level changed from "1" to "0". The CPU*a* 11 can generate a read-write signal R/W*a* 26 having a logic level of "1", only after the signal WAIT*a* 25 has its logic level changed from "1" to "0".

Since the signal WAIT*a* 25 now has a logic level of "0", the CPU*a* 11 gives forth, as shown in FIG. 2(*e*), a read-write signal R/W*a* 26 having a logic level of "1", after the address signal AD*a* 20 has its logic level changed from "1" to "0". When the read-write signal R/Wa 26 has a logic level of "1", the AND gate circuit 27 generates an AND output, because the address decoder A23 issues an output having a logic level of "1". As the result, said AND gate circuit 27 delivers an output of "1" to the bidirectional bus driver DRVa 28 for actuation. At this time, an output from the Q terminal of the flip-flop circuit 29 has a logic level of "1", causing a read-write signal R/Wa 26 having a logic level of "1" to be conducted through an AND gate circuit 33 and OR gate circuit 34 to the common memory RAMc 19. Since on terminal of an AND gate circuit 35 is supplied with a "1" output from the Q terminal of the flip-flop circuit 29, address information stored in the address register A21 is transmitted to the common memory RAMc 19 through the address bus line S22, AND gate circuit 35 and OR gate circuit 36 in turn. As the result, the CPUa 11 takes a read-write action with respect to that of the RAMc 19 addresses which was previously designated by the address register A21 according to a read-write signal R/Wa 26 given forth from the CPUa 11. Since, at this time, the address bus line S22 does not specify any address of the ROMa 14 and RAMa 15, data stored in those memories is not read out.

When execution of the first program instruction A1 is brought to an end, the CPUa 11 generates a memory access cycle signal MACa 32 having a logic level of "0", as shown in FIG. 2(b).

At this time, the first program instruction B1 for the CPUb 12 is not delivered to the common memory RAMc 19. As the result, the address decoder B37 belonging to the CPUb 12 produces an output of "0", as shown in FIG. 2(i). An AND gate circuit 38 is not opened, but supplies a "0" output to a bidirectional driver DRVa 39 to render it nonconducting, thereby disconnecting the CPUb 12 from the common memory RAMc 19. Accordingly, the CPUb 12 makes an access to the corresponding exclusive ROMb 17 or RAMb 18. Since, as mentioned above, the address decoder b37 issues a "0" output, an AND gate circuit 40 produces an output WAITb 41 having a logic level of "0". Consequently, as described with respect to the first program instruction A1 for the CPUa 11, the CPUb 12 specifies any address of the corresponding exclusive ROMb 17 or RAMb 18 through an address bus line B43 according to the prescribed address information stored in an address register B42. Thus, data is written in or read out from that of the addresses of the ROMb 17 or RAMb 18 which was previously designated, according to a read-write signal R/Wb 44 delivered from the CPUb 12. Namely, the CPUb 12 carries out an arithmetic operation according to access information supplied from the ROMb 17 or RAMb 18. This means that a memory access cycle signal MACb 45 (FIG. 2g) issued upon execution of the first program instruction B1 by the CPUb 12 is obtained at the same time as the memory access cycle signal MACa 32 produced upon execution of the first program instruction A1 by the CPUa 11, thereby enabling both CPUa 11 and CPUb 12 to carry out the respective allotted arithmetic operations at the same time.

Thereafter, the CPUa 11 and CPUb 12 get ready to execute the corresponding program instructions A2, B2. Since these second program instructions A2, B2 order both CPUa 11 and CPUb 12 to have an access to the common memory RAMc 19, it is necessary to keep either of said CPU elements in a waiting position. With the microcomputer system of this invention shown in FIG. 1, the CPUa 11 is given a priority under the above-mentioned condition. Therefore, the CPUa 11 first has an access to the common memory RAMc 19 and the CPUb 12 has an access thereto. When the CPUa 11 has carried out the second program instruction A2, the CPUa 11 sends forth an address signal Ada 20 having a logic level of "1" (FIG. 2(c). As the result, the address register A21 is stored with an address information allowing the CPUa 11 to have an access to the common memory RAMc 19. Accordingly, the address decoder A23 generates an output of "1" as shown in FIG. 2d. Since, at this time, an output from the Q terminal 30 of the flip-flop circuit 29 has a logic level of "0", the AND circuit 24 issues an output WAITa 25 also having a logic level of "0" as shown in FIG. 2(f). Thereafter, a read-write signal R/Wa 26 (FIG. 2(e)) is delivered from the CPUa 11. Where the second program instruction A2 given to the CPUa 11 is of the "read" type, then data stored in that of the addresses of the common memory RAMc 19 which was previously designated according to address information stored in the address register A21 is read out to the CPUa 11 through the bidirectional driver A28. Where said second program information A2 is of the "write" type, then data stored in the CPUa 11 is written through the bidirectional driver A28 in that of the addresses of the common memory RAMc 19 which was previously specified. Thus, transfer of data is effected between the CPUa 11 and common memory RAMc 19.

Upon receipt of the second program instruction B2, the CPUb 12 delivers an address signal ADb 46 to the address register B42, which in turn is stored with that address information supplied from the CPUb 12 through the bus line B16 which indicates that said CPUb 12 is going to have an access to the common memory RAMc 19. At this time, the address decoder B37 issues an output having a logic level of "1" (FIG. 2(i)). Since an output from the Q terminal 31 of the flip-flop circuit 29 has a logic level of "1", the AND gate circuit 40 which received a "1" output from the decoder B37 sends forth a "1" output WAITb 41 (FIG. 2(k)). So long as said signal WAITb 41 continues to have a logic level of "1", the CPUb 12 does not issue a read-write signal R/Wb 44, and consequently is prevented from executing the second program instruction B2. Namely, the CPUb 12 is kept in a waiting position, until the signal WAITb 41 has its logic level changed from "1" to "0".

When the CPUa 11 finishes the execution of the second program instruction A2 and in consequence the memory access cycle signal MACa 32 has a logic level of "0", then an inverter 47 issues an output having a logic level of "1". Since, at this time, the address decoder B37 generates an output of "1", an AND gate circuit 48 sends forth an output of "1". This "1" output from the AND gate circuit 48 sets the flip-flop circuit 29 which has been reset, as shown in FIG. 2a, up to this point. When the flip-flop circuit 29 is thus set, an output from the Q terminal 30 has a logic level of "1", and an output from the Q terminal 31 has a logic level of "0". When the signal WAITb 41 has a logic level of "0", the CPUb 12 issues a read-write signal R/Wb 44 having a logic level "1". Since, at this time, one input terminal of an AND gate circuit 49 is supplied with a "1" output from the Q terminal 30 of the flip-flop circuit 29, address information stored in the address register B42 designates any of the addresses of the common memory RAMc 19 through the address bus line B43, AND gate circuit 49 and OR gate circuit 36 in turn. Upon receipt of a "1" read-write signal R/Wb 44 from the CPUb 12, the AND gate circuit 38 which is already supplied with a "1" output from the address decoder B37 sends forth a "1" output to a bidirectional driver DRVb 39 to render it conducting. Since, an AND gate circuit 50 is supplied with a "1" output from the Q terminal 30 of the flip-flop circuit 29, a read-write signal R/Wb 44 delivered from the CPUb 12 is conducted through the AND gate circuit 50 and OR gate circuit 34 to the common memory RAMc 19, thereby allowing the CPUb 12 to have an access to said common memory RAMc 19. As the result, transfer of data is carried out between the CPUb 12 and common memory RAMc 19. When the execution of the second program instruction B2 by the CPUb 12 is brought to an end, then the memory access cycle signal MACb 45 has a logic level of "0" as shown in FIG. 2b. This memory access cycle signal MACb 45 is inverted by an inverter 51 and carried to the reset input terminal of the flip-flop circuit 29. As the result, the flip-flop circuit 29 which has been set up to this point is reset, as shown in FIG. 2a, in the timing in which the memory access cycle signal MACb 45 has its logic level changed to "0".

When the CPUa 11 finishes the execution of the second program instruction A2 (at this time the memory access cycle signal MACa 32 has a logic level of "0") and the flip-flop circuit 29 has been changed from a reset state to a set state through the inverter 47 and AND gate 48, then the AND gate circuit 24 gives forth an output WAITa 25 having a logic level of "1" (FIG. 2(f)). This "1" signal WAITa 25 obstructs the issue of a read-write signal R/Wa 26 from the CPUa 11 but not inhibit the generation of the memory access cycle signal MACa 32 and address signal ADa 20. After execution of the second program instruction A2, therefore, the CPUa 11 is made ready to carry out the succeeding third program instruction A3. When an address signal ADa 20 associated with the third program instruction A3 has its logic level changed from "0" to "1", as shown in FIG. 2(c), by the CPUa 11, then the address decoder A23 produces a "0" output (because, as previous described, the third program instruction A3 does not order the CPUa 11 to have an access to the common memory RAMc 19). As the result, the AND gate circuit 24 generates an output WAITa 25 having a logic level of "0" (FIG. 2(f)). Thereafter, the CPUa 11 can issue a read-write signal R/Wa 26. When the CPUa 11 fully carries out the third program instruction A3, the memory access cycle signal MACa 32 has a logic level of "0".

When the execution of the second program instruction B2 by the CPUb 12 is brought to an end, the flip-flop circuit 29 which has been set up to this point is reset, causing the AND gate circuit 40 to issue an output WAITb 41 having a logic level of "1" (FIG. 2(k)). For the execution of the third program instruction by the CPUb 12, therefore, an address signal ADb 46 has its logic level changed to "1" to store address information in the address register B42. Since, however, an output from the address decoder B37 still has a logic level of "1" as shown in FIG. 2(i) (because the third program instruction B3 orders the CPUb 12 to have an access to the common memory RAMc 19) and an output WAITb 41 from the AND gate circuit 40 has a logic level of "1", the CPUb 12, cannot immediately give forth a read-write signal R/Wb 44 having a logic level of "1", but is kept in a waiting position. Where, under this condition, the CPUa 11 finishes the execution of the third program instruction A3, then the memory access cycle signal MACa 32 has a logic level of "0" (FIG. 2(b)). This "0" memory access cycle signal MACa 32 is conducted through the inverter 47 and AND gate circuit 48 to set, as shown in FIG. 2a, the flip-flop circuit 29 which has been reset up to this point. When the flip-flop circuit 29 is set, an output WAITb 41 from the AND gate circuit 40 has a logic level of "0" (FIG. 2(k)). Therefore, the CPUb 12 which has been kept in a waiting position immediately issues a read-write signal R/Wb 44 having a logic level of "1" (FIG. 2(j)). As the result, the CPUb 12 causes, as previously described, data stored in that of the addresses of the common memory RAMc 19 which was previously designated through the address line B43 to be read out to the CPUb 12 through the bidirectonal bus driver DRVb 39 or to be written in that of the addresses of the common memory RAMc 19 which was previously specified, thereby carrying out an arithmetic operation based on the third program instruction B3. When the CPUb 12 fully executes the third program instruction B3, the memory access cycle signal MACb 45 has a logic level of "0" (FIG. 2(g)). Consequently, the flip-flop circuit 29 is brought back to the original reset condition (FIG. 2(a)).

With the microcomputer system of this invention shown in FIG. 1, the flip-flop circuit 29 is reset, each time the CPUb 12 completes a memory access cycle. Where, therefore, the CPUa 11 is going to have an access to the common memory RAMc 19, the CPUa 11 is given a priority to be saved from a waiting position, unless the CPUb 12 has already made an access to the common memory RAMc 19 ahead of the CPUa 11. Thus the CPUa 11 never fails to have an access to said common memory RAMc 19, whenever required. Further, both CPUa 11 and CPUb 12 can be given an equal access priority by inserting an AND gate circuit 55 shown in broken lines in FIG. 1 between the inverter 51 and the reset terminal R of the flip-flop circuit 29, connecting one input terminal of the AND gate circuit 55 to the output terminal of the inverter 51 and the other input terminal of said AND gate circuit 55 to the output terminal of the address decoder A23 and further connecting the output terminal of said AND gate circuit 55 to the reset terminal R of the flip-flop circuit 29.

With the microcomputer system of the invention shown in FIG. 1, the CPUa 11 is provided with an exclusive random access memory RAMa 15 and the CPUb 12 is provided with an exclusive random access memory RAMb 18. However, either or both of said exclusive memory elements can be omitted. In such case, either of the data memory area required for the CPUa 11, CPUb 12 may be concurrently used as a common memory RAMc 19.

Figure 3:
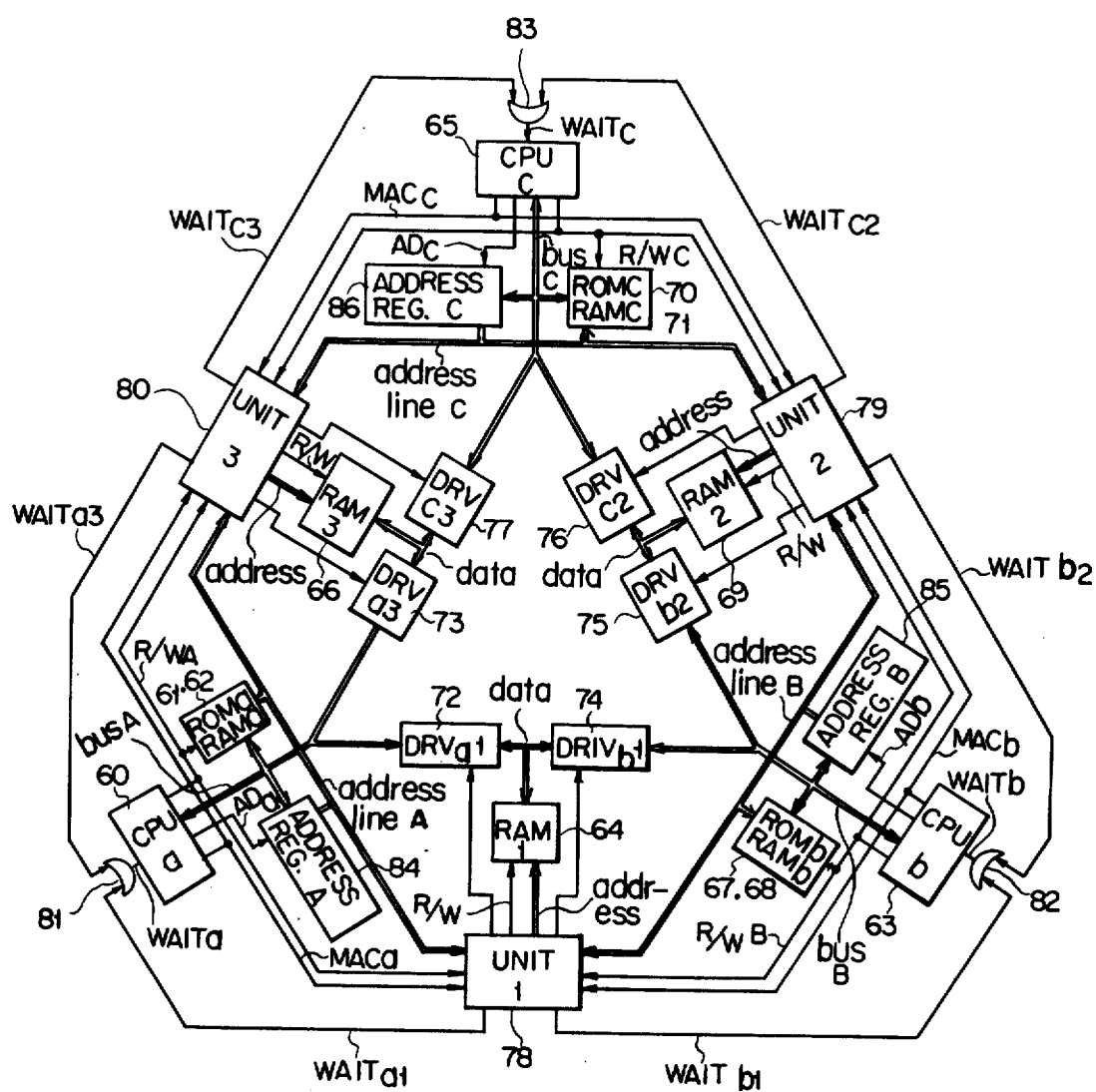
FIG. 3 is a block circuit diagram of a microcomputer system according to another embodiment of the invention which comprises three microcomputers.

FIG. 3 is a block circuit diagram of a microcomputer system according to another embodiment of this invention which is formed of three microcomputers. This embodiment represents an enlargement of the microcomputer system of FIG. 1 comprising two CPU elements. Referring to FIG. 3, CPUa 60 can have an access to the corresponding exclusive read only memory ROMa 61, exclusive random access memory RAMa 62, another random access memory RAM1.64 used in common to the CPUa 60 and CPUb 63, and still another random access memory RAM3.66 used in common to the COUCPU60 and the CPUc 65. Similarly the CPUb 63 can have an access to the corresponding exclusive read only memory ROMb 67, exclusive random access memory RAMb 68, another random access memory Ram1.64 used in common to the CPUb 63 and CPUa 60, and still another random access memory RAM2.69 used in common to the CPUb 63 and CPUc 65. Likewise, CPUc 65 can have an access to the corresponding exclusive read only memory ROMc 70 and exclusive random access memory RAMc 71, another random access memory RAM3.66 used in common to the CPUc 65 and CPUa 60 and still another random access memory RAM2.69 used in common to the CPUc 65 and CPUb 63. Under this arrangement, transfer of data between the CPUa 60 and RAM1.64 is effected through a bidirectional bus driver DRVa1.72, and transfer of data between the CPUa 60 and RAM3.66 is carried out through a bidirectional bus driver DRVa3.73. Transfer of data between the CPUb 63 and RAM1.64 is performed through a bidirectional bus driver DRVb1.74, and transfer of data between the CPUb 63 and RAM2.69 is conducted through a bidirectional bus driver DRVb2.75. Transfer of data between the CPUc 65 and RAM2.69 is achieved through a bidirectional bus driver DRVc2.76, and transfer of data between the CPUc 65 and RAM3.66 is accomplished through a bidirectional bus driver DRVc3.77.

Referring to FIG. 3, UNIT1.78, UNIT2.79, UNIT3.80 are each formed of the same elements as those of the microcomputer system of FIG. 1, that is, the address decoder A.23, address decoder B 37, AND circuits 27, 33, 50, 38, 35, 49, 48, 24, 40, OR circuits 34, 36, inverters 47, 51 and flip-flop circuit 29 (the elements included in a region indicated in broken lines in FIG. 1). Therefore, the respective UNITS 1, 2, 3 are operated in the same manner as in the microcomputer system of FIG. 1. Signal lines connecting the UNITS 1, 2, 3 to the external apparatus is denoted by the same designations as used in FIG. 1.

The CPUa 60 can have an access to any of the addresses of the corresponding exclusive ROMa 61 and RAMa 62 the common RAM1.64 and common RAM3.66. With respect to the CPUb 63, CPUc 65, access control is carried out in the same manner as in the CPUa 60.

Where, with the microcomputer system of FIG. 3, the CPUa 60 and CPUb 63, for example, are going by chance to have an access to the common memory RAM1.64 at the same time, then the UNIT1.78 generates a signal WAITa1 to prevent the CPUa 60 from issuing a read-write signal and also a signal WAITb1 to keep the CPUb 63 in a waiting position. Similarly, the UNIT2.79 sends forth signals WAITb2, WAITc2, and the UNIT3.80 produces signals WAITc3, WAITa3. Among these WAIT signals, the one obtained by passing the signals WAITa1, WAITa3 through an OR gate 81 is supplied as a signal WAITa to the CPUa 60. Likewise, the one obtained by conducting the signals WAITb2, WAITb1 through an OR gate 82 is delivered as a signal WAITb to the CPUb 63. Similarly, the one obtained by transmitting the signals WAITc3 and WAITc2 through an OR gate 83 is supplied as a signal WAITc to the CPUc 65. Thus, transfer of data between the three CPU's and memories is effectively carried out according to address information stored in the corresponding address registers 84, 85, 86. The microcomputer system of FIG. 3 is so designed as to determine each time which the three CPU's should be given an access priority.

While the microcomputer system of FIG. 3 comprises three microcomputers, it is also possible to provide any number of CPU's interpose a common random access memory RAM between every adjacent CPU's and carry out transfer of data between the respective CPU's and common random access memories RAM.

Further, with the microcomputer system of FIG. 3, the RAM3.66, UNIT3.80 and bidirectional bus drivers 73, 77 can be omitted. In this case, data can be exchanged between the CPUa 60 and CPUc 65 through the common access memory RAM1.64, CPUb 63 and the common access, memory RAM2.69.

This invention is not restricted to the above-mentioned embodiments, but various changes and modifications can be made without departing from the spirit and scope of this invention.

What is claimed is:

1. A multi-processing system for controlling microcomputers and memories comprising
    a plurality of microcomputers each provided with an exclusive memory which is put into access with a corresponding microcomputer whenever the microcomputer designates an address within a first range;
    a plurality of common memories each connected to two of the microcomputers and put into access with either of the two microcomputers whenever either microcomputer designates an address within a second range;
    a plurality of detector means, each including an address decoder to detect that the corresponding microcomputer designates an address within said second range, provided at every microcomputer for detecting whether or not the microcomputer designates the address of a corresponding common memory according to address data from the microcomputer; and
    a plurality of control means each for controlling the access between every two microcomputers and the corresponding common memory based on detection outputs of corresponding detector means so that one of the two microcomputers is prohibited from being put into access even if designating the address of the common memory while the other microcomputer is in access with the common memory and is put into access with the common memory upon completion of a memory access cycle of the other microcomputer whereby every two microcomputers are separately put in access with their exclusive memories, respectively, if no data exchange is made between them through the corresponding common memory.

2. A multi-processing system according to claim 1 wherein the control means comprises
    first and second inverters for inverting the memory access cycle signals from every two microcomputers, respectively;
    a first AND gate circuit for obtaining a logical product between the output of the first inverter and the output of the detector means associated with one of the two microcomputers;
    a flip-flop circuit which is set by the output of the first AND gate circuit and reset by the output of the second inverter;
    a second AND gate circuit for obtaining a logical product between the set output of the flip-flop circuit and the output of the detector means associated with the one of the two microcomputers; and a third AND gate circuit for obtaining a logical product between the reset output of the flip-flop circuit and the output of the detector means associated with the other of the two microcomputers.

3. A multi-processing system according to claim 2 further comprising
- a first selection means for making a choice between the addresses designated by every two microcomputers, the first selection means having a first AND circuit for obtaining the sum of the set output of the flip-flop circuit and the address data designated by one of the two microcomputers, a second AND circuit for obtaining the sum of the reset output of the flip-flop circuit and the address data designated by the other of the two microcomputers, and an OR gate circuit for obtaining a logical sum of the outputs of the first and second AND circuits;
- a second selection means for making a choice between the read/write signals from every two microcomputers, the second selection means having a first AND gate circuit for obtaining the sum of the set output of the flip-flop circuit and a first read/write signal from one of the two microcomputers, a second AND gate circuit for obtaining the sum of the reset output of the flip-flop circuit and a second read/write signal from the other of the two microcomputers, and an OR gate circuit for obtaining a logical sum of the outputs of the first and second AND gate circuits;
- a third AND gate circuit for controlling the data from one of every two microcomputers while receiving the detection output of the detector means associated with the microcomputer; and
- a fourth AND gate circuit for controlling the data from the other of the two microcomputers while receiving the detection output of the detector means associated with the other of the two microcomputers.

4. A multi-processing system for controlling microcomputers and memories comprising
- a plurality of microcomputers, a plurality of exclusive memories which are put into access with the microcomputers, respectively, whenever the memory addresses specific to them are designated by the associated microcomputers;
- a plurality of common memories each of which is put into access with two of the microcomputers whenever a common memory address is designated by either of the two microcomputers;
- a first address decoder for detecting that one of every two microcomputers is in access with the common memory connected to the two microcomputers;
- a second address decoder for detecting that the other of every two microcomputers is in access with the common memory connected to the two microcomputers; and
- a flip-flop circuit which is set upon completion of the memory access between one of every two microcomputers and the common memory connected to the two microcomputers while the second address decoder is producing a detecting signal and which is reset upon completion of the memory access between the other of the two microcomputers and the common memory connected to the two microcomputers whereby, when one of every two microcomputers is put into access with the associated common memory during the reset period of the flip-flop, a read/write cycle is immediately carried out under the control of the associated microcomputer at the address of the common memory which is designated by the accessed microcomputer, when the other of the two microcomputers is put into access with the associated common memory during the reset period of the flip-flop, the second address decoder prohibits the other microcomputer from starting a read/write cycle, when the other microcomputer is put into access with the associated common memory during the set period of the flip-flop circuit, a read/write cycle is immediately carried out under the control of the other microcomputer at the address of the common memory which is designated by the accessed microcomputer, and when the one of the two microcomputers is put into access with the associated common memory during the set period of the flip-flop circuit, the first address decoder prohibits the one of the two microcomputers from starting a read/write cycle.

* * * * *